W. A. DONNELL.
Corn-Planter.
No. 67,735. Patented Aug. 13, 1867.
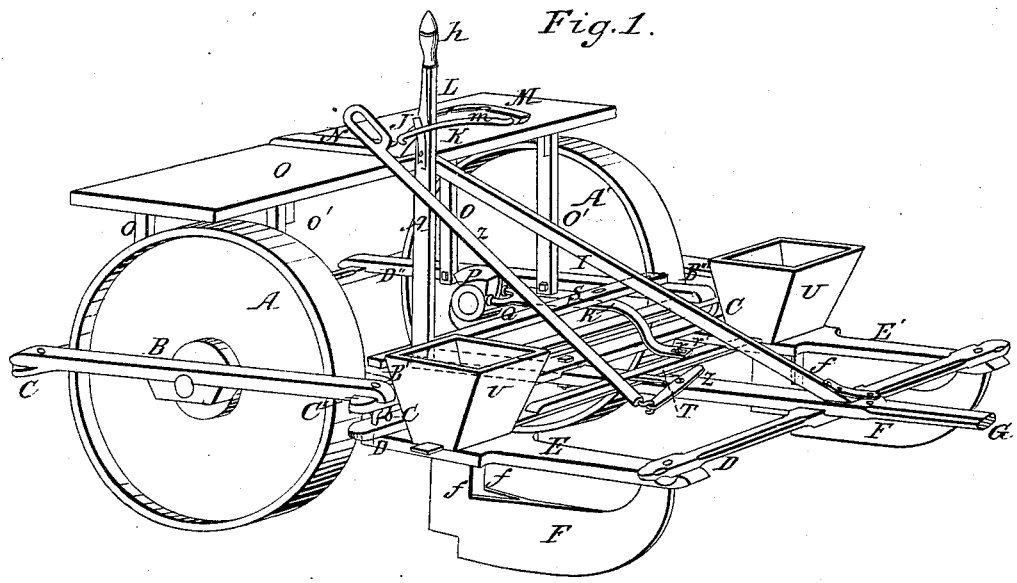
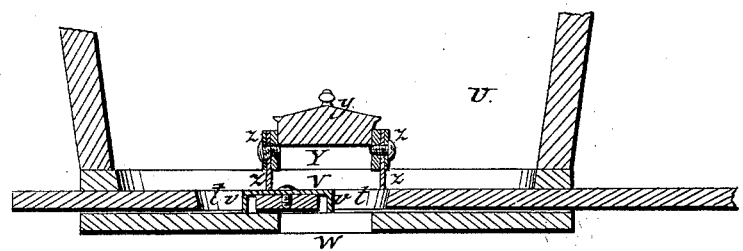

United States Patent Office.

WILLIAM A. DONNELL, OF GREENSBURG, INDIANA.

Letters Patent No. 67,735, dated August 13, 1867.

---

IMPROVEMENT IN CORN-PLANTER.

---

*The Schedule referred to in these Letters Patent and making part of the same.*

---

TO WHOM IT MAY CONCERN:

Be it known that I, WILLIAM A. DONNELL, of Greensburg, Decatur county, Indiana, have invented a new and useful Corn-Planter; and I hereby declare the following to be a full, clear, and exact description thereof, reference being had to the accompanying drawings, making part of this specification.

This invention relates to improvements in the class of two-row corn-planters, which admit of automatic or hand-operating mechanism for dropping the corn. In the accompanying drawings—

Figure 1 is a perspective view of a corn-planter embodying my improvements.

Figure 2 is an enlarged section of part of the seed-dropping apparatus.

A A' are wheels axled beneath the longitudinal pieces B B' B'' B'''. The pieces B B', &c., are firmly affixed to transverse bars C C'. The bar C is hinged, $c$, near either end, to another transverse bar D'. The bar D' rests upon and is attached to flattened beams E E'. Beneath the beams E E' are affixed the shares F F, formed in the shape of a thin sleigh-runner in the front part, and opening behind into two plates $f f$, to allow the seed sufficient space to drop through. On the front ends of the beams E E' is attached the bar D. A tongue, G, passes over the bar D, and beneath the bar D', and, extending backward, is mortised to an upright bar, H, ending in a handle, $h$. The bar H has firmly attached to it a brace-bar, I, connecting the said bar H rigidly to the tongue at its intersection with the bar D. Upon the lever-bar H is a spring, J, which, by acting against the guard K, serves to press a catch, L, into one of a series of notches, $m$, in the plate M, which plate is attached to an arm, N, fastened to the seat O. The seat O is supported upon legs $o$ on the pieces B' B''. Upon the spindle of the wheel A is a cam, P, which acts alternately upon the two roller-armed ends $q$ of the horns Q of a lever, R. The lever R is pivoted to the cross-bar S, upon the pieces B' B'', and, extending forward, has a slot, $r$, near its front extremity, to receive a screw, $r'$, in a sliding-bar, T. The seed mechanism is shown enlarged in fig. 2. The bar T has toward each end two seed-cavities $t\ t$. Upon the bar T, between the cavities $t\ t$, is fastened a plate, V, having ends $v\ v$ turned down at a right angle into the approximating sides of the seed-cavities. The plate V may be changed for one of greater or less length, so as to diminish or increase the sides of the cavities $t\ t$. The hopper U has in its bottom a lengthened hole, W, through which the seed drops when one of the seed-cavities $t$ comes vertically over sufficient of it to allow the corn to drop through. The bar T has below a slotted projection, which slides in an appropriate passage in the bottom of the seed-hopper U. The said projection serves to work a seed-catch in the spout of the drill-share, and to act as a guide to the bar T. Upon the bottom of each seed-hopper is a box, Y, having a cover, $y$, and upon opposite sides of this box are sweepers Z, of India rubber, or some other appropriate substance, kept in place by covers of sheet metal, $z$, which are screwed fast to the said box. The India rubber serves to sweep the superfluous corn from the top of the cavities $t$. Pivoted upon the tongue G is a three-armed lever, 1, having connected to one arm a pitman-lever, 2. The side arm of the lever 1 passes into a slot in the bar T, and, pushing or pulling the lever 2, puts the dropping apparatus in motion if the bar T is disengaged from the lever Q $q$ R $r$, which may easily be done by removing the screw $r'$ from the bar T.

The operation of this corn-planter is as follows: When the machine is drawn forward, the cam P, acting upon the lever R, slides the seeding-bar T backward and forward. As the seed-cavities $t\ t$ come out from under box Y, they become filled with corn, and when the action is reversed, the rubber Z gently brushes away the superfluous corn as the cavity passes beneath it, and when the seed-cavity comes over the drop-hole W, the corn is allowed to drop into the seed-passage of the drill-share. When it is desired to drop by hand, as would be necessary when planting the corn in hills, the screw $r'$ must be removed, in which case the bar T and seeding apparatus admit of free movement by the lever 2. To raise the rear part of the drill-shares F F from the ground, the lever-bar H is thrown over toward the guard, releasing the catch L from the notch $m$ when the lever is moved forward. In moving the upper end of the lever H forward, the forward point of the tongue is depressed, which has the effect to raise the shares F F, but more especially the rear ends of them, from the ground, the rear frame tilting backward and riding exclusively upon the wheels. By means of the lever H the shares may be entirely raised from the ground, for the removal of the machine from field to field, or they may be raised more or less, as shallower or deeper planting is desired, the notches $m$ admitting of considerable variation. The amount of corn dropped at a time is regulated as stated by the removal of the plate V $v\ v$, and the substitution of another of different length, and it will be observed that the alteration in size of the seed-cavities takes place at the side of the cavities nearest to the cut-off Z, so that when the said cavities are reduced to their minimum size, they shall still pass well out into the seed-hopper, and insure a full freight up to their capacity; and this matter is of much importance, as the grains of corn are so large, and of such a shape as to make it difficult to insure a full flow of grains into a cavity proportioned to hold but about three grains. This central adjustment of size in the seed-cavities involves the necessity of some arrangement, admitting of ready access to the adjusting-plate V, in order that one of different length may be substituted as occasion requires, and for this purpose I provide the box Y with a lid, $y$, which lid being raised, the plate V can be loosened and removed at any time with ease.

I claim herein as new, and of my invention—

1. The arrangement, in a corn-planter, of the rigid triangular frame, consisting of the tongue G, lever-bar H, and brace-bar I, in combination with the rack M $m$, or its equivalent, for the purpose of raising the shares F F from the ground, as stated, and retaining them in that position.

2. I claim the angle-ended plate V $v$ $v$, of varying sizes, to simultaneously increase or diminish the size of the seed-cavities $t$ $t$, as set forth.

3. In combination with the plate V $v$ $v$, I claim the box Y $y$, admitting of changing the said plates by merely removing the lid $y$, as stated.

4. I claim the combination of the cam P, lever Q $q$ R $r$, and levers 1 and 2, substantially as described, to admit of working the seed-dropping apparatus, either by hand or by the rotation of the cam P and its accessories.

In testimony of which invention I hereunto set my hand.

WILLIAM A. DONNELL.

Witnesses:
 GEO. H. KNIGHT,
 SAMUEL KNIGHT.